Sept. 18, 1951     P. J. GRATTAN     2,568,445
PISTON OPERATED DRAFT HITCH FOR VEHICLES Filed July 23, 1946     3 Sheets-Sheet 1

Inventor
Peter J. Grattan

By Wilfred E. Lawson
Attorney

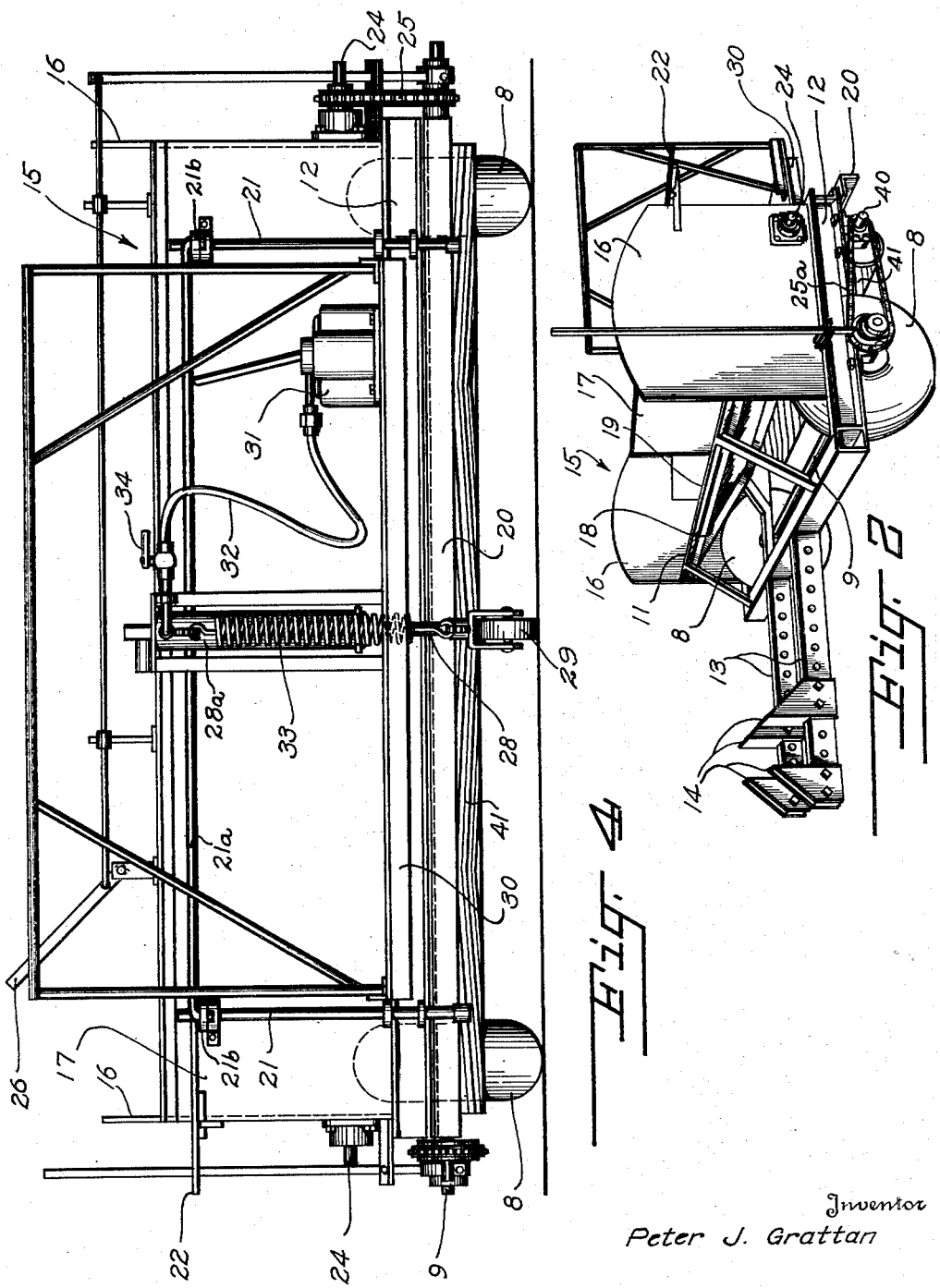

Sept. 18, 1951 P. J. GRATTAN 2,568,445
PISTON OPERATED DRAFT HITCH FOR VEHICLES
Filed July 23, 1946 3 Sheets-Sheet 3
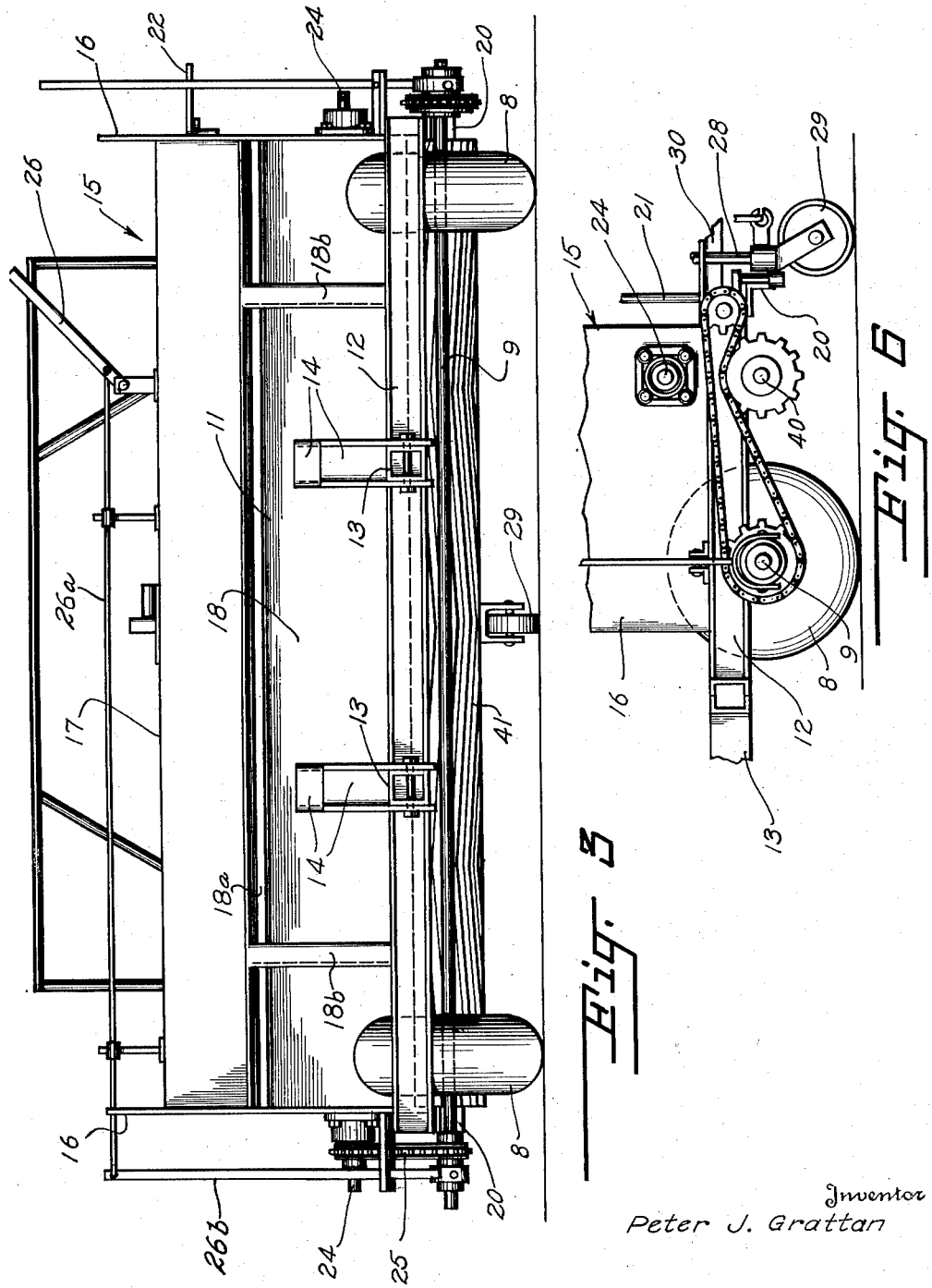
Inventor
Peter J. Grattan
By Wilfred E. Lawson
Attorney Patented Sept. 18, 1951

2,568,445

UNITED STATES PATENT OFFICE 2,568,445

PISTON OPERATED DRAFT HITCH FOR VEHICLES

Peter J. Grattan, Minneapolis, Minn.

Application July 23, 1946, Serial No. 685,729

3 Claims. (Cl. 280—33)

The present invention relates to a device for sanding roads, roadbeds, black topping, icy streets and highways as well as for other similar purposes.

This spreader is primarily intended for hitching to a truck loaded with sand or other material of similar character and adapted either for forward or backward running.

The spreader is therefore provided with a hitch which is movable for easy connection and disconnection to the truck, which is preferably done by hydraulic mechanism although other means may be used.

The improvement of the hitch therefore makes it "a one man outfit" on account of its easy and convenient handling. The speed with which it can be done is, of course, a big factor and consumes only a time of two or three minutes.

This and other advantages and distinguishing features will be brought out in the following description with the aid of the attached drawings which form part of this application.

In the drawings:

Figure 2 is a view in perspective of the spreader herein disclosed.

Figure 3 is a view in front elevation of the same.

Figure 4 is a view in rear elevation of the spreader.

Figure 6 is a fragmentary side elevation view opposite from the side shown in Figure 5.

Figure 1:
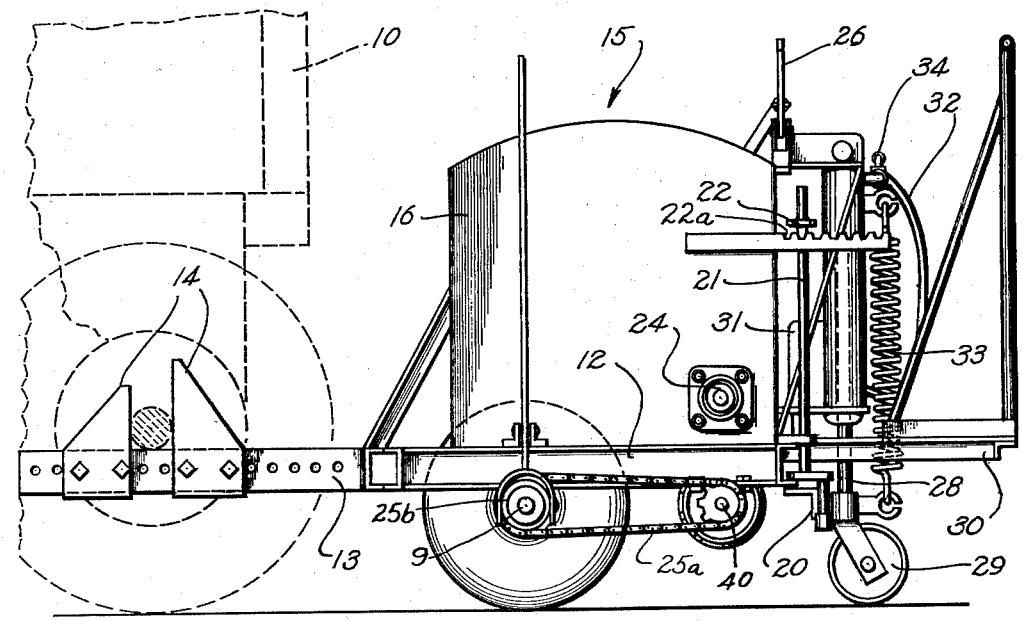
Figure 1 is a view in side elevation of a spreader constructed in accordance with an embodiment of the invention and coupled with a truck, said truck being diagrammatically illustrated by broken lines.

Reference numeral 10 denotes a sand truck and 15 in general designates the sand spreader of the present invention. This spreader consists of a rectangular bottom frame 12 provided with a pair of forwardly directed hitch bars 13 adapted to engage with the rear axle or a transverse rod on the truck 10. These hitch bars have each a pair of coupling jaws 14 with which to grip around the truck axle. These jaws are adjustable as to width apart and position on said bars to accommodate the truck axle. The frame 12 is supported on the ground by a wheel 8 at each end of an axle 9 near the front end of the hopper.

On top of the frame work 12 is permanently fixed the sand box or hopper 11, which consists of two end plates 16, a vertical rear plate 17 and a downwardly slanting bottom 18 extending from end to end of the hopper and reinforced by an angle-iron 18a along its top edge in front, and braced by suitable braces 18b.

The lower edge of the slanting bottom 18 terminates a short distance from the rear hopper plate 17 to provide a narrow slit or discharge opening for the sand from a feeder roller. A long angle-iron or valve member 20 is adapted to regulate the width of the opening and the discharge of sand. This angle-iron or valve member 20 is therefore suspended on vertical crank shafts 21 which are operatively connected by the cross bar 21a between cranks 21b, secured to the top ends of the shafts 21. These crank shafts 21 are operated by a ratchet lever 22 from the left side of the sand hopper. The ratchet lever is secured in adjusted position by engagement in a notch of a horizontal ratchet bar 22a secured to the side of the structure.

Figure 5:
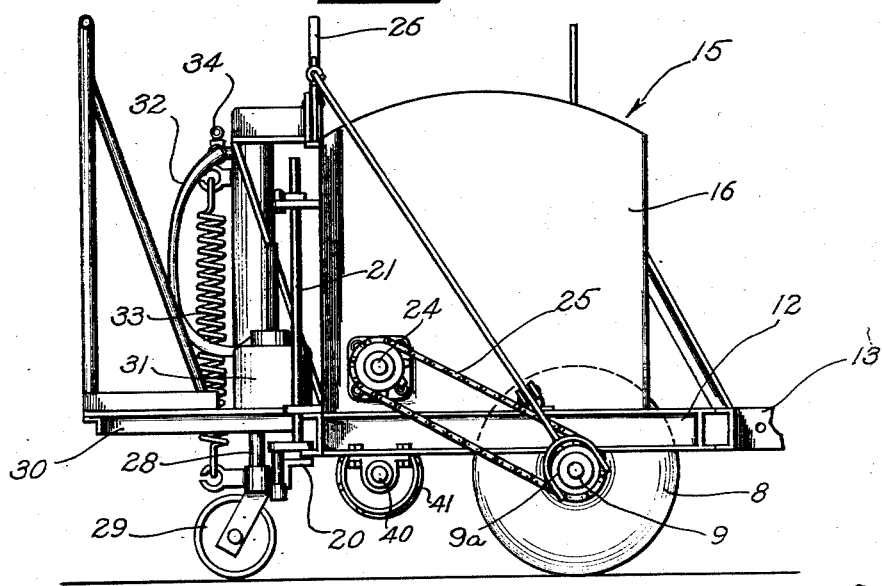
Figure 5 is a view in side elevation.

As usual, a discharge roller, not shown, operated by chain drive 25 from the hopper wheel axle 9, is provided along the outlet opening of the hopper. This roller is carried on a cross shaft 24. The chain connection between the shaft 24 and the wheel axle 9 is shown in Figure 5, on the right side of the hopper box 11. A friction clutch 9a is provided to connect or disconnect the drive between the roller shaft 24 and the main wheel axle 9. This clutch is controlled by a lever 26 and the shaft 26a and arm 26b.

In order to facilitate the hitching and unhitching of the sand truck to and from the spreader, use is made preferably of a hydraulically operated ram rod 28 with a small wheel or caster 29 at its lower end. The rod carries a piston, not shown, housed in a cylinder 28a supported on a platform 30 for one or two operators along the rear of the hopper box 11. Near the ram rod is carried on the platform a hydraulic jack 31 with a hose 32 connecting it with the ram cylinder 28a. A spring 33 is provided to lift the caster from the ground. An operating handle 34 is shown for actuating the ram and caster wheel.

It will be evident that by providing a two-wheel support for the hopper, this makes the hitching up much easier. With the caster 29 pushed down on the ground this will raise the rear end and lower the front end of the spreader so that the jaws 14 can pass under the shaft of the truck. By thereupon pulling the handle 34 and releasing the pressure on the ram, the spring 33 will then raise the caster 29 from the ground. Since the hopper is rear heavy from the sand load therein and the center of gravity located back of the wheel axle 9, the hitch jaws 14 will now swing upward to grip the truck axle.

Another advantage of this two wheel arrangement of the sand spreader is its usefulness for "black topping" as this must be done by backing both the truck and the spreader.

Below and in parallel relation with the feed wheel supporting shaft is a shaft 40 which is suitably rotatably supported by the frame 12 and which carries a ribbed or grooved distributor roller 41 onto which the sand or other material flows from within the hopper and by which such material is evenly spread or distributed over the underlying surface. This roll is operatively coupled with the axle 9 by the chain and sprocket coupling 25a as shown in Figure 1 and a clutch means 25h is provided for establishing or breaking the driving connection between the axle 9 and the distributor roller or drum 41, as will be readily apparent.

It is to be understood that the invention as herein disclosed may be varied from the details described and shown without departure from the spirit of the subjoined claim.

I claim:

1. A machine of the character described for connection as a trailer with a draft vehicle having an accessible transversely extending part such as an axle, said machine comprising a material carrier, wheel supporting means for the carrier positioned forwardly of the center of gravity of the carrier, a draft hitch for connecting the trailer with the said transverse part of the draft vehicle, said draft hitch comprising a forwardly extending bar, a pair of upstanding jaws carried by the bar and having a spacer relation to receive between them the said transverse part of the draft vehicle, the center of gravity for the carrier being a sufficient distance rearwardly of the supporting axle to overbalance the carrier and the weight of the draft hitch, a power unit supported upon the rear of the carrier and including a vertical cylinder and a downwardly extending piston, a caster wheel carried upon the lower end of said piston for contact with the ground, means for introducing fluid pressure into the cylinder to effect the projection of the piston downwardly whereby to elevate the rear of the carrier and lower the hitch bar to effect the disengagement of said jaws from said part of the draft vehicle, and spring means functioning to normally resist the downward movement of the piston whereby to elevate the piston and the caster wheel upon the withdrawal of fluid pressure from the cylinder.

2. A machine of the character described for connection as a trailer with a draft vehicle having an accessible transversely extending part such as an axle, said machine comprising a material carrier, wheel supporting means for the carrier positioned forwardly of the center of gravity of the carrier, a draft hitch for connecting the trailer with the said transverse part of the draft vehicle, said draft hitch comprising a forwardly extending bar, a pair of upstanding jaws carried by the bar and having a spaced relation to receive between them the said transverse part of the draft vehicle, the center of gravity for the carrier being a sufficient distance rearwardly of the supporting axle to overbalance the carrier and the weight of the draft hitch, said jaws comprise upstanding U-shaped members having the hitch bar extending therethrough, said hitch bar having a plurality of longitudinally spaced apertures, and coupling bolts for extension through apertures in the jaws and for selective engagement in the apertures of the hitch bad whereby to secure said jaws in adjusted spaced relation.

3. A machine of the character described adapted for connection with a member of a draft vehicle such as the rear axle thereof, comprising a load carrier, supporting wheels for the carrier positioned forwardly of the center of gravity thereof, a draft hitch comprising a pair of forwardly extending draft bars connected with the carrier, a pair of spaced upstanding jaws carried by each draft bar, said jaws being adapted to receive between them and above the draft bars, the said member of the draft vehicle, a vertically disposed ram cylinder supported at the rear of the carrier adjacent to the transverse center thereof, a piston rod within the cylinder and extending downwardly therefrom, a caster wheel carried upon the lower end of the piston rod, means carried upon the rear of the carrier for introducing fluid under pressure into the cylinder to effect the downward ejection of the rod, whereby to oscillate the carrier around the axis of the supporting wheels to effect the lowering of said jaws for disengagement from the draft vehicle, and a coil spring having one end connected to the upper end of the cylinder and the other end connected to the lower end of said rod, said spring being placed under tension upon the downward ejection of the rod whereby to effect the retraction of the rod and caster wheel upon withdrawal of the fluid pressure from the cylinder, the center of gravity for the carrier being a sufficient distance rearward of the supporting axle to overbalance the weight of the carrier and the draft hitch.

PETER J. GRATTAN.

REFERENCES CITED

The following references are of record in the file of this patent:

UNITED STATES PATENTS

| Number | Name | Date |
|---|---|---|
| 266,488 | Mahaffy | Oct. 24, 1882 |
| 1,000,004 | Huber | Aug. 8, 1911 |
| 1,741,598 | Ackerman | Dec. 31, 1929 |
| 1,790,050 | Kellner | Jan. 27, 1931 |
| 1,925,020 | Young | Aug. 29, 1933 |
| 2,046,603 | Baumgardner | July 7, 1936 |
| 2,057,655 | Anthony et al. | Oct. 20, 1936 |
| 2,119,263 | Baumgardner | May 31, 1938 |
| 2,252,690 | Arndt | Aug. 19, 1941 |
| 2,252,691 | Arndt | Aug. 19, 1941 |
| 2,375,970 | Williams | May 15, 1945 |